Patented Sept. 26, 1933

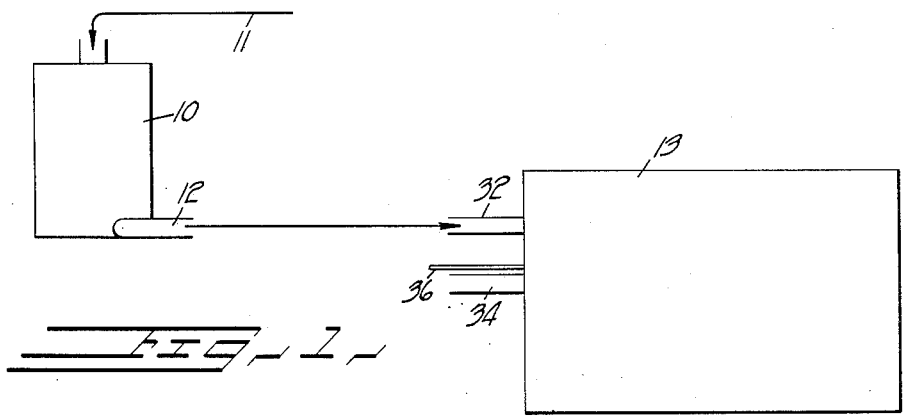
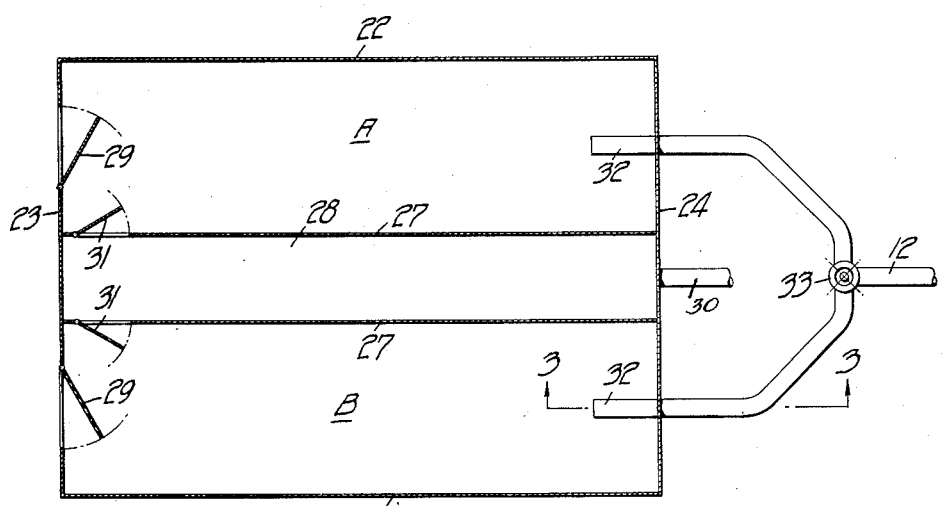
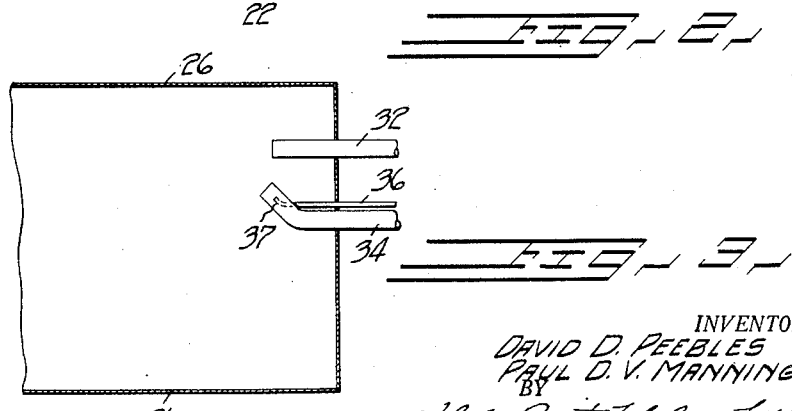

1,928,135

UNITED STATES PATENT OFFICE 1,928,135

METHOD FOR MANUFACTURE OF LACTOSE CONTAINING MATERIAL

David D. Peebles, Eureka, and Paul D. V. Manning, Berkeley Woods, Calif.

Application February 15, 1932. Serial No. 592,858

4 Claims. (Cl. 99—11)

This invention relates generally to the manufacture of products in stable form from fluid materials containing such quantities of milk sugar that desiccation thereof in ordinary spray type desiccators results in a product markedly hygroscopic, as for example ordinary milk whey. The invention also relates to apparatus for carrying out such methods.

It has long been appreciated that milk whey can be desiccated to form a dry powder in ordinary spray type desiccators generally utilized for desiccation of milk. However the marked hygroscopic nature of such desiccated whey has rendered it unfit for commercial purposes. If a mass of such desiccated material is left exposed to the atmosphere it rapidly absorbs moisture and in time is converted to a solid cake. Therefore it is impractical to store or ship the same except in expensive sealed cartons or containers. Furthermore such material is difficult to dissolve in water, because when mixed with water it tends to form sticky lumps. Furthermore its hygroscopic properties make it relatively unpalatable, and therefore unfit as a stock feed or for human consumption. It may be briefly explained that such desiccated material is highly hygroscopic because the milk sugar content thereof, which constitutes a substantial percentage of the solids of milk whey, is in anhydrous form. As will be presently explained, by the method of the present invention the milk sugar content is converted to a monohydrate, in which form it is relatively stable.

One method of converting hygroscopic desiccated whey powder to stabilized form, is to cause or permit it to absorb sufficient water to convert a mass of the same to a solid cake, after which the cake is ground. Such methods are relatively costly, due to the apparatus required, and if dehydration is resorted to for the purpose of driving away excess water, an inferior product frequently results.

It is an object of the present invention to devise a method of manufacturing stabilized products from materials of the above character, which is relatively inexpensive to carry out commercially, and which results in a high grade product suitable as a stock feed or for human consumption.

It is a further object of the invention to devise a novel apparatus for carrying out the method of the present invention.

Further objects of the invention will appear from the following description in which the preferred embodiment of the invention has been set forth in detail in conjunction with the accompanying drawing. It is to be understood that the appended claims are to be accorded a range of equivalents consistent with the state of the prior art.

Referring to the drawing:

Figure 1 is a diagrammatic view illustrating the system or arrangement of apparatus utilized in our method.

Fig. 2 is a plan view illustrating a duplex arrangement of treatment chambers utilized in the conversion of material to a stabilized form.

Fig. 3 is a cross sectional detail taken along the line 3—3 of Fig. 2.

Our method can probably be best understood after a detailed description of the drawing. Referring to Fig. 1, 10 represents a spray type desiccator into which the fluid material to be desiccated is introduced thru line 11. In desiccators of this character the fluid material is sprayed or atomized into a chamber in contact with hot drying gas. In order to facilitate coordination of the desiccator with other parts of my apparatus, the desiccator is constructed in such a manner that the desiccated powdered material is discharged thru a conduit from the desiccating chamber, together with gas from the chamber, the gas serving as a pneumatic conveying medium. Thus in this instance the desiccator is shown provided with a discharge conduit 12. While various forms of desiccators can be employed, apparatus such as disclosed in Peebles application Ser. No. 164,991 filed January 31, 1927 will give good results.

The desiccated powdered material delivered to conduit 12 together with gas from the desiccating chamber, is preferably introduced directly into a stabilizing treatment apparatus 13. As will be presently explained, this apparatus is in the form of a chamber, and in addition to being in communication with conduit 12, is in communication with a source of moisture and with a source of additional air.

Apparatus 13 may consist of a single treatment chamber but since this apparatus is particularly adapted for batch operations, and since it is desirable to operate desiccator 10 continuously, it preferably consists of two or more chambers which selectively can serve to continuously receive desiccated material. Thus referring to Figs. 2 and 3, apparatus 13 consists of bottom wall 21, side walls 22, end walls 23 and 24, and top wall 26. Intermediate the side walls 22 are the upright partition walls 27, which form between them a passageway 28 for flow of gas. Thus two treatment chambers A and B are provided. Doors 29 provide convenient access to chambers A and B, while doors 31 permit communication between passage 28 and either of chambers A or B. Conduits 32 extend into both chambers A and B thru end wall 24, and are both connected to conduit 12 from the desiccator thru a two-way distributing valve 33. As shown more clearly in Fig. 3, additional conduits 34 also extend thru end wall 24, one conduit 34 being positioned under a corresponding conduit 32. As will be presently explained these conduits 34 permit introduction of additional air or other gas into chambers A and B. For the purpose of admitting controlled quantities of moisture, a steam pipe 36 is also shown extending into each chamber. Exteriorly pipes 36 are connected to a suitable source of relatively wet steam at a pressure which is only slightly greater than atmospheric. The inner discharge ends 37 of pipes 36 are located within the inner discharge portions of conduits 34 and both the inner portion 37 of pipe 36 and the inner portion of conduit 34, are directed upwardly for a purpose to be presently explained.

To explain the mode of operation of the apparatus described above, it will be presumed that desiccating apparatus 10 is functioning continually, and that distributing valve 33 is arranged to discharge the powdered material from the desiccator together with gases therefrom, into chamber A of apparatus 13. At this time door 29 of chamber A is closed, while door 31 leading from this chamber to passage 28 is open. The door 31 communicating between passage 28 and chamber B is closed. The gas introduced together with the desiccated material thru conduit 32 is at an elevated temperature by virtue of the fact that it is delivered directly from the desiccator. In one installation of our apparatus, the temperature of this gas at its point of introduction is about 180 deg. F. This gas is also relatively moist but is not saturated. Simultaneously with the introduction of desiccated powdered material to the conduit 32, wet steam is continually introduced thru the corresponding pipe 36 at a controlled rate. By virtue of the aspirating action of the steam jets, air at atmospheric temperature is drawn in thru conduit 34. The powdered material delivered thru conduit 32 tends to distribute itself in the form of a cloud throughout the upper portion of the chamber A, and the particles then settle by gravity down to the lower portion of the chamber. Moisture or vapor introduced by way of steam pipe 39 is likewise distributed throughout the interior of chamber A, and the amount of moisture is such that particles of the powder settling within the chamber accumulate a certain amount of water. Distribution of moisture and likewise distribution of the powdered material introduced thru conduit 32, are aided by the air and atmospheric temperature introduced thru pipe 34, and this relatively cool air likewise serves to materially reduce the temperature existing within the chamber. Gas free from entrained powdered particles is permitted to exhaust thru passage 28 and conduit 30. It may be noted at this point that the temperature within chamber A varies at different points, depending upon the proximity of such points to the discharge end of conduit 32. However the average temperature is materially lower than the temperature of gas introduced thru this conduit, but is somewhat higher than the temperature of air introduced thru conduit 34.

After a predetermined quantity of material has been introduced into chamber A, valve 33 is adjusted so as to discharge the desiccated powdered material into chamber B, door 31 leading to chamber A is closed, and door 31 leading to chamber B is open. At the same time introduction of steam into chamber A is interrupted, and introduction of steam into chamber B is commenced. Door 29 leading to chamber A is then opened to the atmosphere, and any powdered particles remaining in suspension in chamber A permitted to settle. At this time there will be an accumulated layer of settled particles upon the bottom of chamber A, of snow like character. This layer is permitted to set for a period of about two hours, after it is removed by any suitable method. This setting period permits complete conversion of the anhydrous milk sugar, to a monohydrate. In other words water accumulated by the particles while settling within the chamber is absorbed as water of crystallization. During this settling period desiccated powdered material together with moisture is being continually introduced in chamber B, where the same cycle previously described is taking place. After a predetermined quantity of desiccated material and moisture has been introduced in chamber B, the completely converted material in chamber A will have been removed, and then material in chamber B can be permitted to set while material is again introduced into chamber A. Thus by alternating between chambers A and B, it is possible to accommodate the continuous discharge of desiccating apparatus 10.

In order to effect proper conversion, it is evident that the desiccated material must absorb sufficient water or moisture to completely convert the milk sugar to the monohydrate form. To satisfy the milk sugar, an amount of water equal to about 5.3% by weight of the milk sugar content is required. We prefer to utilize a slight excess of water, which excess is absorbed by other solids of the desiccated whey. For example, a whey product stabilized by our method having a total water content of 7% by weight, is typical.

It is characteristic of our method that the material being treated remains in divided form, so that no grinding is required. Storage and shipment are facilitated because of its stabilized state. The product is palatable and can be readily dissolved in water, and at the same time the product will not spoil like liquid whey which has not been desiccated. A large part of the proteins present are in uncoagulated and soluble form, thus making the product high in nutritive value.

The product removed from the treatment chambers may contain lumps of varying sizes, but these lumps can be readily broken up, and are not compact solid masses or cakes. To eliminate such lumps the material can be forced through a screen, or can be conveyed pneumatically through a rotary blower to reduce the lumps by impact.

The present application is a continuation in part of our co-pending applications Serial Nos. 458,984, filed June 2, 1930, and 329,875, filed January 2, 1929.

We claim:

1. In a process for stabilizing material containing sufficient quantities of anhydrous milk sugar as to be markedly hygroscopic, causing the material in divided form to be suspended in a gaseous medium through which moisture is distributed, there being sufficient moisture to cause the particles of material to accumulate water, allowing the particles of the material to settle into a mass, and allowing the mass to set a sufficient length of time to effect conversion of milk sugar to a more stable form without formation of a compact cake.

2. In a process for stabilizing material containing a sufficient quantity of milk sugar in anhydrous form as to be otherwise markedly hygroscopic, causing the material in divided form to be suspended in a gaseous medium at an elevated temperature, distributing moisture thru said medium to cause the particles of material to accumulate water thereon, allowing the particles to settle lightly into a mass, and allowing the mass to set for a length of time sufficient to effect substantial conversion of milk sugar to a monohydrate without formation of a compact cake.

3. A process for the manufacture of a stabilized divided product from fluid material containing sufficient milk sugar as to result in a markedly hygroscopic powder when desiccated in an ordinary spray type desiccator, characterized by the use of a treatment chamber of substantial height; said method comprising desiccating said fluid material to form a dry hygroscopic powder, introducing the powder into the upper portion of said treatment chamber together with a gaseous medium whereby the particles of the powder settle into a mass at the lower portion of the chamber, distributing moisture within the chamber whereby the particles accumulate water while settling, and allowing the mass to set in the lower portion of the chamber for a substantial period sufficient to effect substantial conversion of milk sugar to the monohydrate form, without formation of a cake.

4. A method of manufacturing a powdered stabilized lactose containing product comprising desiccating material containing lactose from fluid form to form a powdered and substantially anhydrous material, causing a mass of said powdered material to be placed in suspension with a gas, distributing a predetermined amount of moisture throughout the mass while so suspended, the amount of moisture being at least equal to about 5.3 of the weight of lactose but being insufficient to convert the material into an agglomerated mass, permitting the suspended material to settle into an uncompact mass, and then permitting the mass to rest for a time period sufficient to substantially complete conversion of the lactose to non-hygroscopic form.

PAUL D. V. MANNING.
DAVID D. PEEBLES.